United States Patent [19]
Colley et al.

[11] Patent Number: 4,487,117
[45] Date of Patent: Dec. 11, 1984

[54] COOKING APPLIANCE WITH LID AND OPEN WORK BASKET

[75] Inventors: Jacques L. J. Colley; André P. J. Vrydags, both of Liege, Belgium

[73] Assignee: ITT Industries, Inc., New York, N.Y.

[21] Appl. No.: 540,104

[22] Filed: Oct. 7, 1983

Related U.S. Application Data

[63] Continuation of Ser. No. 373,067, Apr. 29, 1982, abandoned, which is a continuation of Ser. No. 73,779, Sep. 10, 1979, abandoned.

[30] Foreign Application Priority Data

Sep. 13, 1978 [BE] Belgium .............................. 2/57276

[51] Int. Cl.³ ............................................. A47J 37/12
[52] U.S. Cl. ......................................... 99/341; 99/403; 116/276; 73/334; 220/82 R
[58] Field of Search .................. 99/340, 341, 346, 403, 99/446; 126/1, 4, 19, 21 R, 42, 80, 190, 198, 273 R, 281, 299 R, 299 D; 220/82.5, 82 R, 20; 219/405; 73/334; 116/276

[56] References Cited

U.S. PATENT DOCUMENTS

| | | | |
|---|---|---|---|
| 143,574 | 10/1873 | Hoadley | 220/82 R |
| 1,275,598 | 8/1918 | Probst | 220/82 R |
| 1,836,827 | 12/1931 | Thau | 99/341 X |
| 3,128,363 | 4/1964 | Rose et al. | 99/341 X |
| 3,145,643 | 8/1964 | Strouth | 126/299 D |
| 3,278,114 | 10/1966 | Gibbs | 126/299 D |
| 3,366,035 | 1/1968 | Jones | 99/341 X |
| 3,463,077 | 8/1969 | Lescure | 99/403 |
| 3,667,648 | 6/1972 | Koziol | 220/82 R |
| 3,714,885 | 2/1973 | Wertheimer et al. | 99/340 X |
| 3,801,331 | 4/1974 | Sano et al. | 99/403 |
| 3,964,378 | 6/1976 | Dunkelman | 99/446 X |
| 4,034,663 | 7/1977 | Jenn et al. | 126/299 D |
| 4,145,194 | 3/1979 | Horlacher et al. | 126/299 D |

FOREIGN PATENT DOCUMENTS

| | | | |
|---|---|---|---|
| 3103450 | 10/1982 | Fed. Rep. of Germany | 99/403 |
| 513542 | 2/1921 | France | 220/82 R |
| 1517736 | 2/1968 | France . | |
| 29653 | 9/1973 | Japan . | |

OTHER PUBLICATIONS

"Lexikon Der Bautechnik", 1966, vol. 10, p. 534.
"Bauelemente Der Feinmechanik", 1957, 6th Edition, Verlag.
Brochure "Grilamid TR 55" of Emser Werke AG, ch-8039 Zurich, Edition 5, Aug. 1977.
Brochure "Grilamid" IR-Mark 291-936, Les Marques Intl., Dec. 11, 1964, p. 2579.

Primary Examiner—Billy J. Wilhite
Attorney, Agent, or Firm—John T. O'Halloran; Jeffrey P. Morris

[57] ABSTRACT

A cooking appliance including a vat for containing food during cooking, having a lid for engaging the vat. The lid has a transparent portion forming a double window consisting exclusively of an upper window and a lower window congruently placed on top of each other and an air space sealed therebetween, such that the lower window is exposed to cooking vapors emanating from the vat and the upper window is exposed to the outside atmosphere. Improved visibility through the windows is obtained during cooking. The upper and lower windows comprise a single unitary closed shell surrounding the air space.

8 Claims, 11 Drawing Figures

COOKING APPLIANCE WITH LID AND OPEN WORK BASKET

This application is a continuation of application Ser. No. 373,067 filed Apr. 29, 1982, abandoned, which is a continuation of Ser. No. 073,779, filed Sept. 10, 1979 abandoned.

The invention relates to a cooking appliance with lid, the latter being provided with a transparent part.

Such a window presenting itself in the shape of a flat disk slantingly inserted in the lid, has been proposed for a domestic deep fryer in French Pat. No. 1 517 736 but it is suppressed in an improved version described in the first addition No. 94 107. Indeed, although it appears desirable to be able to observe the cooking process, particularly in deep fryers provided with a perforated lid having an odour filter, lids with a window do not seem to have been currently available on the market during the last decade and numerous laboratory attempts made by the applicant did not succeed, not only in what concerns the reliability of the transparent materials tried for the window, these being unable to withstand the high temperature inside a deep fryer or to resist the oil or grease vapours, but also in what concerns an adequate visibility.

A first object of the invention is to realize such a window able to withstand high temperatures while enabling good visibility during the cooking operation.

In accordance with a first characteristic of the invention, the transparent part is constituted by upper and lower windows spaced from one another.

In accordance with a second characteristic of the invention, the two windows are part of a single closed shell.

In accordance with a third characteristic of the invention, the shell is provided with a rim between the planes of the two windows and the lid is surmounted by an upper lid cover, both with openings enabling the mounting of the shell by squeezing said rim between the edges of the openings.

In accordance with a fourth characteristic of the invention, said lid is made out of a metal ensuring a good thermal contact between the vat of the appliance and said lower window.

In accordance with a fifth characteristic of the invention, the windows are realized in a polyamide 12 material with aliphatic, cyclo-aliphatic and aromatic base which is transparent and withstands heat as well as oil and grease vapours.

In this manner by using the principle of the double windows adopted to limit losses of heat in buildings, it proved possible to obtain a good visibility during the cooking operations and as soon as the initial generation of vapours created upon the immersion of the food in the frying material ceases, the vapour deposit on the lower internal side of the window will progressively disappear. The high temperature at which it stands as long as the metal lid is in contact with the rim of the container limits condensation of the water, grease or oil vapours and this will occur essentially upon cooling through opening of the lid. On the other hand, as for double windows whose temperatures are respectively near that of the room and near that which prevails outside, the air or the gases being more or less in movement above and below the shell, the upper window remains at a temperature of the order of 40° centrigrade for instance, i.e. largely below that of the lower window and which is around 140° centrigrade. This result has been obtained despite the realization of the two windows with the help of a single shell, obtained by moulding of two half-shells subsequently united by ultrasonic welding, and without emptying the space inside the shell or without filling it with a gas which is a poor heat conductor such as krypton, this having recently been proposed, with a coating reflecting infra-red rays, for the space between double windows, instead of the more classical solution in that field and consisting in creating a vacuum between the two walls.

As to the material, numerous unsatisfactory attempts have finally led to the polyamide 12 indicated above, Grilamid (trademark) TR55 sold by Emser Werke in Switzerland having revealed itself able to withstand the particularly severe conditions met for the window of a deep fryer while permitting the manufacture of the shell by moulding. Amidel (trademark) nylon sold by Union Carbide Corporation in the United States in an equivalent material.

The invention relates also to an open-work basket with a handle, for a cooking appliance, the basket and the handle being connected to a bracket which can be temporarily associated to a container, displaceable locking means preventiny, when they are operated, relative displacements between the basket, the handle and the bracket but, when they are not operated, enable movements of the handle to displace the basket inside the container.

Such a device has been proposed for a domestic deep fryer in Belgian Pat. No. 770 961. While another system described in the above mentioned French Pat. No. 1 517 736 is destined to raise and lower the basket by rotation of a control knob fixed on the outside of the deep fryer, that of the Belgian patent enables to make the handle entirely integral with the basket. In this manner, one may easily manipulate the basket outside the deep fryer without any risk of the handle and the basket becoming unhooked, while the assembly can be readily associated to the deep fryer by inserting the bracket interconnecting the basket to the handle in a slide-way arranged on the inside wall of the vat. Then, still holding the handle in one hand, the latch can be easily freed by the thumb of this hand to lower the basket in the frying material by letting the handle go up, an inverse movement raising the basket to drain the food. In the unlatched position, the handle can also be folded back on top of the basket by a 180° rotation, this facilitating storage of the appliance.

A second object of the invention is to realize a modified assembly between the basket, the bracket, the handle and the vat so as to enable an easy handling of the basket, including shaking it when the lid of the deep fryer is closed, this being particularly desirable when it is provided with a device filtering the vapours escaping to the outside during the cooking process and of a window enabling the latter to be observed.

In accordance with a sixth characteristic of the invention, the edges of the container and of a lid resting on the latter are not contiguous around the whole of their peripheries but form an opening which can be closed when the bracket is inserted therein, this bracket being perforated to enable the passage of a movable link member between the basket and the handle, the volume of the perforation being practically filled by the link whatever be the position of the handle.

In accordance with a seventh characteristic of the invention, the perforation of the bracket enables the said link member to slide through the bracket when the handle is displaced to move the basket.

In accordance with an eighth characteristic of the invention, with respect to the said link member, the said basket pivots on one side of the bracket and the handle on the other side, in such a way that the weight of the basket pulls the link member inside the container, carrying with it the handle in a position in which it hangs along the outside wall of the container.

In accordance with a ninth characteristic of the invention, said handle has an end in the shape of a nose pressing against the outside surface of the bracket in such a way that when the handle is raised towards the horizontal, outside its hanging position, a pivot between the handle and the said link is drawn away from the bracket, pulling the link and lifting the basket in the container.

In such a way, by keeping the advantages of the device of the Belgian Pat. No. 770 916, one may readily close the lid after insertion of the bracket in a slot cut in the upper rim of the vat and the vapours will continue to escape essentially through the filtering device. Such a handle enables to shake the basket by putting the hand on the lid when it is closed, mainly to avoid a displacement of the deep fryer, the bracket being able to be inserted in the slot with adequate friction. Additionally, it is no longer necessary to provide a slide-way riveted on the inside of the vat and designed to enable anchoring of the bracket, this facilitating cleaning. The use of an elongated handle is particularly suitable for an easy displacement of the basket, even when the lid is closed and while the cooking of the food is observed through the window, particularly in order to shake the basket.

The invention still relates to a perforated lid arrangement resting horizontally on top of a cooking appliance and adapted to unload liquid condensation products coming from the cooking by draining into a basin when it is pivoted out of its horizontal position.

Such a deep fryer lid enabling to recover the condensed liquids has been described in the addition No. 94 107 already mentioned, as well as in French Pat. No. 2 239 224. In these prior arrangements, the perforated lid and containing an odour filter was provided on its lower side with a plate and/or a dished member which is inclined towards the bottom in the direction of the circumference of the lid (domed cover below a plate in the first arrangement) or towards the lid hinge (inclined flat aluminium plate in the second arrangement). In the first case, the condensation liquids can run into a slightly inclined annular gutter surrounding the upper edge of the vat containing the frying material. In the second case, the liquid stays in the lower part of the plate. When the lid is opened and pivots around its hinge, the liquids so contained by the plate can run down into a removable container mounted on the outside of the main container for the frying material, below one of its handles. On the other hand, in the first case, the gutter offers an opening normally closed by a valve which will be removed upon opening of the lid to enable evacuation of the liquids into a lower basin also located on the outside of the container. This evacuation of the liquid is performed in fact in two steps in that case, the liquid first reaching an intermediate chamber part of the lid upon opening of the latter and then running into the basin when the lid is reclosed.

A third object of the invention is to realize a lid producing results generally analogous to the operation described above but without having recourse to a plate or a domed cover mounted below the lid, by conserving for the latter a generally horizontal position.

In accordance with a tenth characteristic of the invention, the perforated lid arrangement is characterized by a metal lid able to close the container of the appliance and an upper lid cover in plastic material fixed on top of said metal lid and hingedly connected to said container.

In accordance with an eleventh characteristic of the invention, a basin collecting the condensation liquids from the cooking makes an integral part of said lid cover and is positioned above the hinge connecting it to said container.

In accordance with a twelfth characteristic of the invention, said basin contains two parts, that of smallest depth having a bottom pierced with an opening communicating with a corresponding opening in the horizontal part of the lid, while a second opening in the lateral wall of this less deep part and opposite to the hinge, communicates with the upper side of the lid.

Such a construction offers various advantages and particularly that fact that when opening the lid slightly beyond the vertical with the help of a handle in the upper lid cover, on the opposite side of the hinge, it will be possible to evacuate the condensation liquids collected in the basin, e.g. by previously removing the small lid which can be provided for the latter. The communication opening between the less deep part of the basin and the lower side of the lid can advantageously be constructed in the form of a vertical lip obtained by cutting away and folding in the upper part of the lid on the edge of its circumference, while the liquids above the lid can directly run down into the basin by the second opening, when the lid is inclined. On the other hand, the metal lid can generally be horizontal and come to rest directly upon the upper rim of the vat of the deep fryer, ensuring in this manner a good thermal contact. This will be particularly useful in the case of a lid possessing not only an odour filter but also a window as already described and this in order to conserve a good visibility, the temperature for the lower part of the lid and for the window remaining high as long as the lid is closed.

The invention still relates to a lid for a cooking appliance which can be snapped into an integral part of the container with the help of an arrangement with pivots engaging into slots provided in this part.

Such a snap-in lid for a deep fryer has been described in the French Pat. No. 2 239 223. It foresees two springs which are mounted into two aligned slots and whose free parts blocking partially the entrance of these slots may be pushed away to insert the pivots into the latter, the lid bearing two pivots engaging into the slots respectively associated thereto.

A fourth object of the invention is to realize a snap-in lid of this type which can be as easily unlatched from the container but without necessitating the use of springs and particularly independent folded springs.

In accordance with a thirteenth characteristic of the invention, the hinge of the said lid is constituted by a rod able to freely pivot at its two ends mounted into the lid and whose bow-shaped central part is off-set from the pivot axis in such a way that when the two parts of the rod in the axis of the pivot are each inserted into a slot integral with the container, the rod thus serving as hinge will be squeezed between the slots on the one hand and the outside rim of the container and the surface of an element integral therewith on the other, spaces remaining between this surface and the parts of the rod linking the central part to the two parts inserted into the slots in such a manner as to allow the insertion of a lever between one of these parts and said surface to disengage the lid from the container.

This device thus avoids independent springs and is particularly simple since only one rod bent as a crankshaft must be mounted at its two ends into holes foreseen in the upper lid cover which can be in moulded plastic material. This material is also used for the slots and the bearing surface immediately below the upper rim of the deep fryer and which constitutes the upper part of one of two lateral pillars mounted vertically along the vat and each provided with one of the handless to lift the latter, the pilar containing the hinge serving also to house the electrical control elements of the deep fryer while the basket handle previously described can be folded back, in a vertical position, in the middle of the second pillar.

A snap-in lid of the type described above is particularly advantageous when it bears not only a filter for the water, oil or grease vapours but also a basin for the condensed liquids from these vapours as well as a window. Indeed, the lid can be very easily detached from the deep fryer and the only element constituting the hinge, i.e. the crank-shaft shaped rod is anchored in the lid so that it cannot be mislaid. When the lid is withdrawn, one can easily evacuate the liquids from the basin into the sink and also proceed with the cleaning of the window, the lid being eventually put into a dishwasher, after having removed the filter cartridge generally using activated carbon.

In accordance with a preferred embodiment of the invention, a domestic deep fryer comprises a generally circular metal lid and topped by an upper plastic cover comprising two diametrically opposed extensions, one used as lid handle and the other as hinge, the latter bearing also a basin for the condensed liquids produced during cooking, the circular part of the upper lid cover comprising a first recess in the shape of a segment in which is lodged an odour filter cartridge and the second constituting an opening above a like shaped opening in the metallic lid, the edges of these openings catching on the rim of a transparent shell in an appropriate polyamide 12 material constituting a window with two separate and superposed surfaces, the open-work metallic basket of the deep fryer being associated to an elongated handle resting vertically along the outer wall of the deep fryer and able to be lifted horizontally to lift the basket, particularly when the lid is closed, a latching device being able to make this elongated handle integral with the basket especially to manipulate it outside the deep fryer, the upper lid cover being on the other hand snapped into the deep fryer in such a manner as to be easily and completely disengaged due to the use of a simple crank-shaft shaped pivot able to be squeezed between two slots and the outside rim of the deep fryer.

The objects and features of the invention mentioned above as well as others and the best manner to attain them shall be better understood from the following description of a detailed embodiment of the invention to be read in conjunction with the accompanying drawings and in which.

Figure 1:
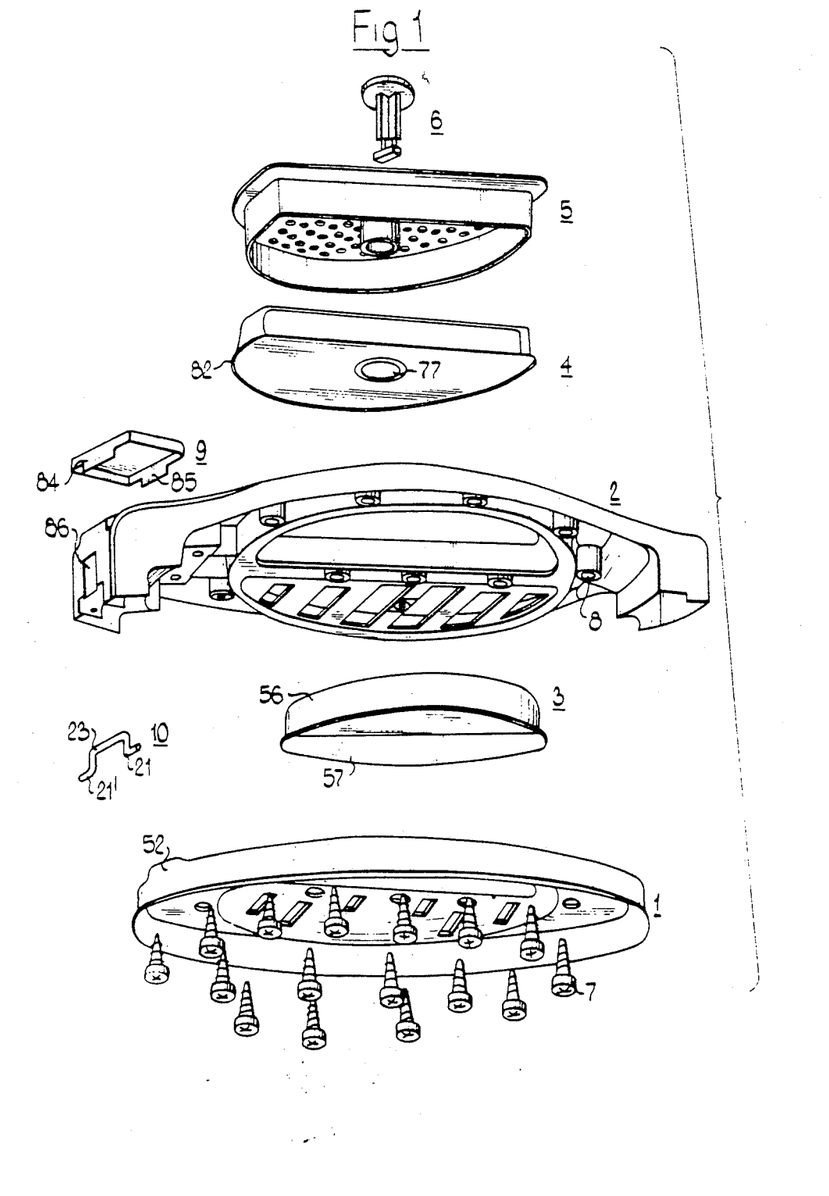
FIG. 1 represents, in the form of an exploded view, the lid of a deep fryer in accordance with the invention, the upper lid cover and the elements directly associated thereto.

By referring to FIG. 1, the latter shows an exploded view of the lid and particularly of the metal lid 1 as such which is covered by an upper lid cover 2 in plastic material, these two elements, once they are assembled, imprisoning a transparent window 3. The upper lid cover 2 is adapted to also receive at the upper part a filter cartridge 4 which may comprise for instance a non-woven material envelope containing activated carbon. This filter cartridge 4 is topped by a cover 5 which will be put into place to firmly fix the filter cartridge with the help of a stud 6 of the type which can be locked by a quarter turn and able to be inserted in aligned openings provided in the cover 5, the filter cartridge 4 and the upper lid cover 2. This last is mounted on the lid 1 by imprisoning the window 3 between these two elements, with the help of sixteen screws such as 7 which engage themselves in corresponding threaded holes such as 8 arranged in the upper lid cover 2. Finally, the exploded view of FIG. 1 shows also the small removable lid 9 of the basin foreseen for the condensed liquids in the upper lid cover 2 and arranged on the side of the lid hinge, whose essential element is the pivot 10 bent in the form of a crank-shaft and permanently mounted in the upper lid cover, below the basin.

The latter appears in FIGS. 2, 3, 5 and 6, the first one showing a plan view of its upper part. As can be verified on FIG. 5, basin 11, of rectangular shape, has two depths, the deepest part 12 serving to store the condensed liquids before the removal of the lid 9 for an emptying operation, the capacity being sufficient so that it must take place only after having used the deep fryer two or three times. The bottom of the upper part 13 is provided with an opening 14 and there is also an opening 15 in the lateral wall on the side of the center of the deep fryer. In this manner, as will be described in detail later on, there is a communication between basin 11 and the lower and upper surfaces of the metal lid 1 which directly rests on the aluminium vat 16 of the deep fryer.

Figure 3:
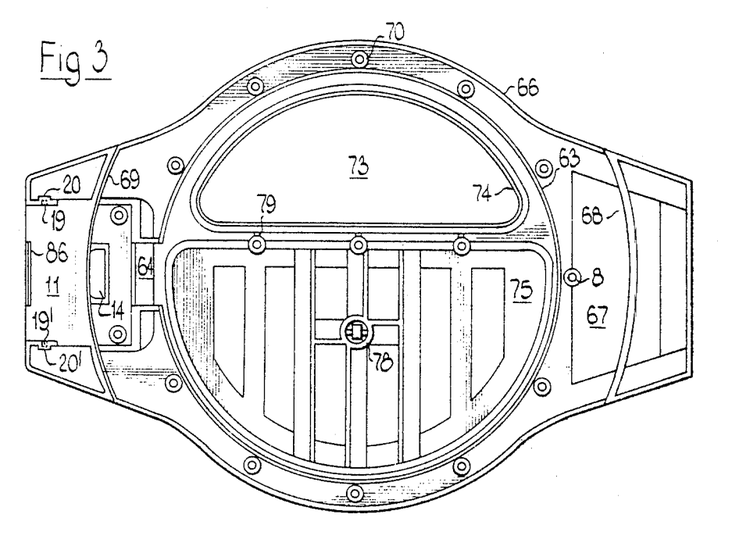
FIG. 3 represents a plan view of the lower face of the upper lid cover.
Figure 5:
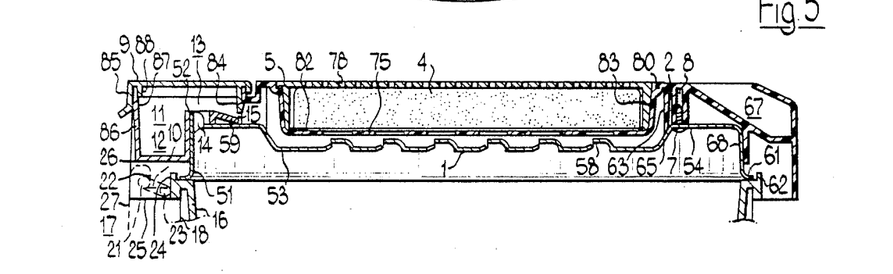
FIG. 5 represents a diametrical sectional view and perpendicular to the hinge, of the upper lid cover mounted on the lid.

Pivot 10 (FIG. 11) having the shape of a crank-shaft and which is the essential element of the hinge between the upper lid cover 2 and one of the vertical plastic pillars 17 arranged on the side of the outside sheet metal wall 18 of the deep fryer, appears also in cross-sectional view of FIG. 5. As shown by FIG. 3 representing the lower side of the upper lid cover 2, this cranked pivot 10 can be mounted at its two ends into holes 19 and 19' provided in partial extensions 20 and 20' of the vertical walls of the basin 11, perpendicularly to the hinge pivot, FIG. 3 indicating a reinforced thickness for these parts 20 and 20'.

As indicated by the cross-sectional view of FIG. 5, the two straight parts 21 and 21' (FIG. 1) whose free ends have been inserted in the holes 19 and 19' (FIG. 3) to enable pivoting, are inserted into two slots such as 22 provided on top of the pillar 17. On the other hand, the central part 23 is squeezed in the angle between the lateral wall 24 of the upper rim of the vat 16 (FIG. 5) and the upper horizontal surface 25 of the pillar 17. This hinge device enables an easy mounting and dismantling of the lid, particularly for cleaning operations on the window 3 and eventually to perform the cleaning of the basin 11, since it is sufficient by means of any appropriate object, for instance the handle of a spoon, to lift one of the lateral straight parts 21 or 21' out of its position shown in FIG. 5 where it has been possible to squeeze it following the resiliency of this pivot 10. By thus inserting this lever below part 21 or 21' of the pivot and by pushing the end of the lever on the upper horizontal surface 25, the central part 23 of the pivot having a bow shape will be able to slide towards the upper side by bearing against the upper lateral wall 24 of the edge of the vat and thus disengage the pivot therefrom.

The unhooking operation which has just been described is performed with an open position (not shown) of the lid and which is clearly beyond the vertical, the limit being defined by the lower edge 26 of the basin 11 coming to abut against the upper vertical wall 27 of the pillar 17, at the back of the slots such as 22. Once the central part 23 of pivot 10 is disengaged from the vat 16, the lid can be easily withdrawn from the slots when it is brought back to an angle of the order of 30° with the horizontal. Naturally, this opening angle should also be used for the reinsertion of the lid, the same instrument being used to put back the pivot 10 in its shown position by exerting a pressure towards the bottom on one of the arms of the pivot joining the ends 21 and 21' to the central part 23.

Figure 7:
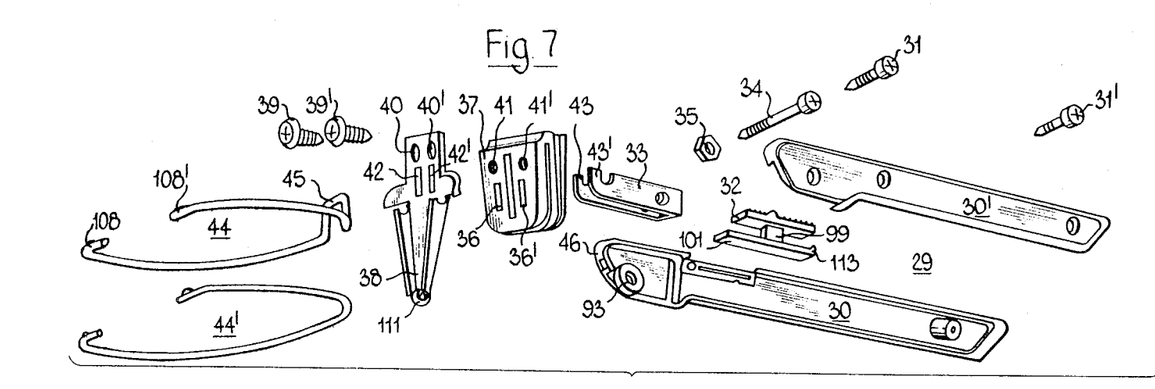
FIG. 7 represents an exploded view of the constituting elements of the elongated handle device for the basket including the connecting-rods bearing the latter.
Figure 9:
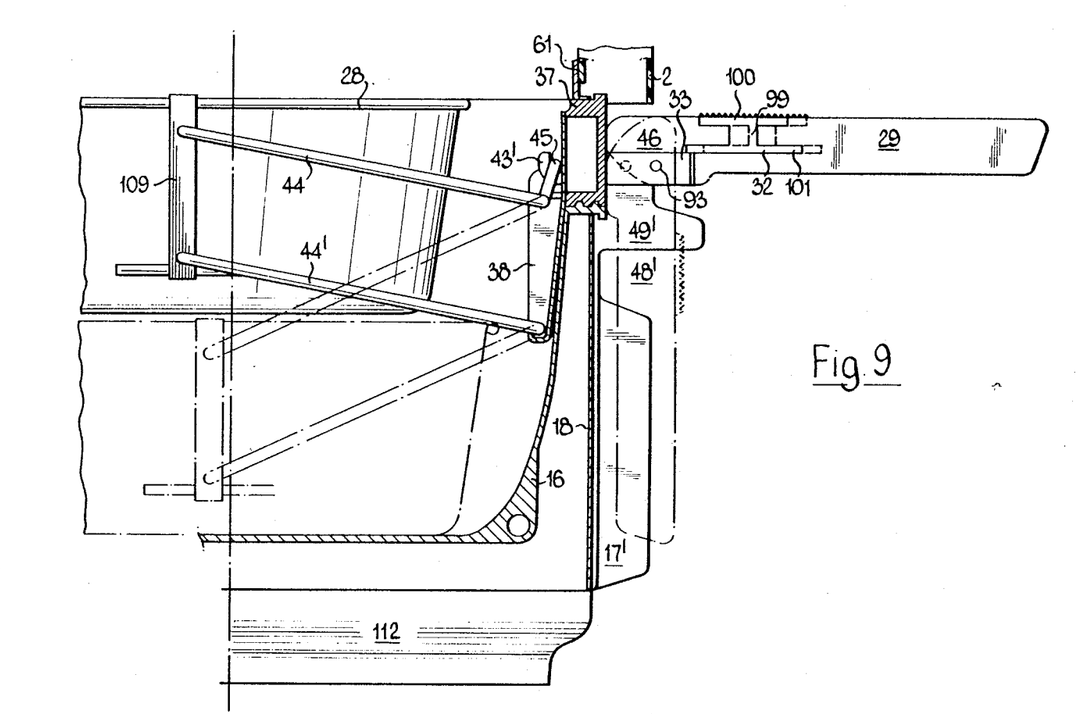
FIG. 9 represents a schematic sectional view of the deep fryer in accordance with the invention with the lid closed and showing the operation of the elongated handle to vertically displace the basket associated thereto.
Figure 11:
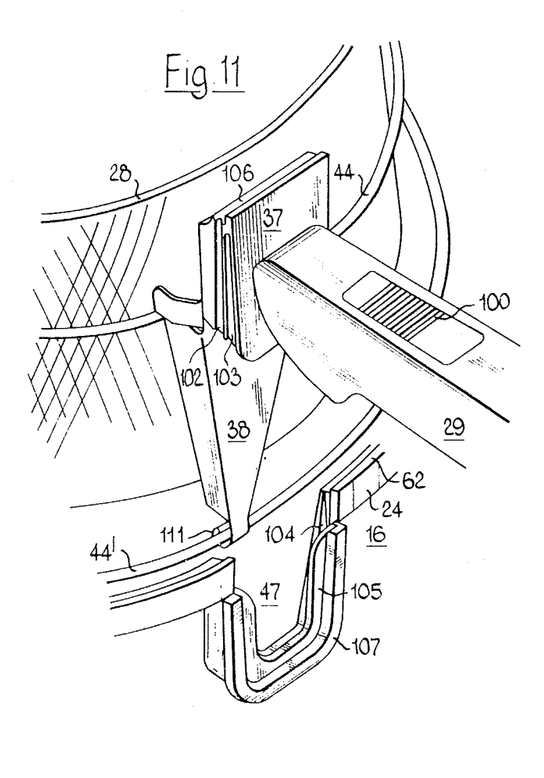
FIG. 11 represents a perspective view of the same elements but seen from the outside of the deep fryer and showing the upper rim of the latter at the place where the bracket for the elongated basket handle is fixed.

The open-work basket 28 of the deep fryer and which is schematically and partially represented in FIGS. 9 and 11 is associated to a handle in the form of an elongated arm 29 appearing on the exploded view of FIG. 7.

Figure 8:
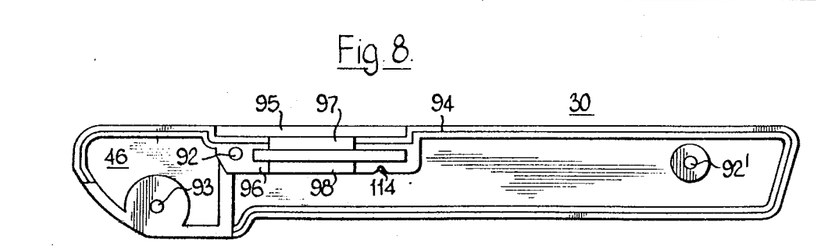
FIG. 8 represents a plan view of the female part constituting a half-handle.

This Figure indicates that it is essentially constituted by two half-handles, the male part 30' and the female part 30 the second being shown in more detail on FIG. 8. These two half-handles 30 and 30' act, when they are assembled one with the other with the help of the screws 31 and 31', as a shell imprisoning on the one hand the latching element 32 and the linking element 33 in the form of a U. This link element is mounted on the threaded pivot 34 fixed through the half-handles 30 and 30' with the help of the nut 35. The two lateral branches of the U are inserted into openings 36 and 36' arranged through the bracket 37 which is in plastic material as the half-handles 30 and 30' the link element 33 being on the other hand in metal. Another metal element 38 serving to fix the basket 28 (FIG. 9) is made integral with the shown side of the bracket 37 (FIG. 7) with the help of screws 39 and 39' passing through the holes 40 and 40' to be screwed into the threaded holes 41 and 41' of bracket 37. The metal bracket 38 is also provided with two vertical elongated openings 42 and 42' aligned on corresponding openings 36 and 36' in the plastic bracket 37 so as to allow the passage of the hook-shaped ends 43 and 43' of the lateral branches of the U forming the metal link element 33.

Figure 10:
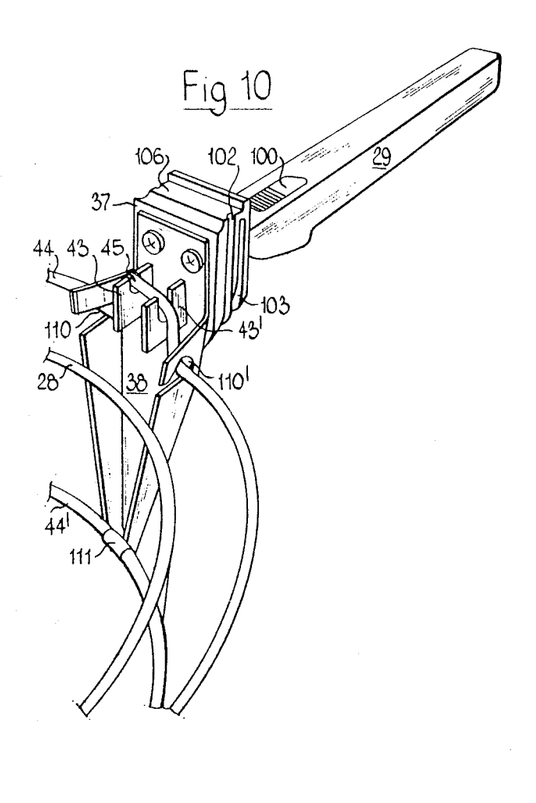
FIG. 10 represents a perspective view showing the link between the connecting-rods bearing the basket and the elongated handle.

As shown also in FIGS. 9 and 10, these hook-shaped ends 43 and 43' enable to hook the upper connecting-rod 44 of the basket 28 and more particularly its central bow-shaped part 45.

In this manner, as shown by the lateral view of FIG. 9 which is a partial cross-section, to a horizontal position of the handle 29 corresponds a raised state for the basket 28. This position is obtained by an upward pivoting of the connecting-rods 44 and 44' of the basket following the traction exerted by the hook-shaped ends 43 and 43' of the link element 33, the nose shaped end 46 of the handle 29 being pushed against the outside surface of the plastic bracket 37 which, as shown by FIGS. 9 and 11, can slide into a slot 47 provided in the upper rim of the vat 16.

Basket 28 can be maintained in this upper position and the handle 29 made integral with the basket by pushing the latching means 32 in the direction of the vat 16, position shown in full line on FIG. 9.

On the other hand, after unlatching, when the elongated handle 29 is allowed to fall back vertically along the outside wall of the deep fryer, the basket 28 can rest at the bottom of the latter. This is partially indicated in FIG. 9 interrupted lines being used for this position on the handle 29, for part of the basket 28 and for the connecting-rods 44 and 44'. As indicated, in this vertical position of the handle 29, it falls into a vertical central slot (not shown) provided in the plastic pillar 17' diametrically opposed to pillar 17 (FIG. 5) on top of which is arranged the hinge for the upper lid cover 2. In addition to this vertical slot enabling the handle 29 to fall back against the deep fryer, a horizontal rectangular recess 48' is also provided on the largest width of the pillar 17', above the hold 49' enabling to lift the deep fryer, parts corresponding to 48' and 49' existing also in a symmetrical fashion for the opposite pillar 17 on the side of the deep fryer hinge. Naturally, the manual hold 49' is interrupted in its middle part to allow the passage of the handle 29 in such a way that there is in fact two holds on each side of the slot 47 (FIG. 11) foreseen in the upper rim of the deep fryer.

The essential elements of the deep fryer having now been described in a general manner, one will examine certain parts and the functioning of the operations in more detail.

Figure 4:
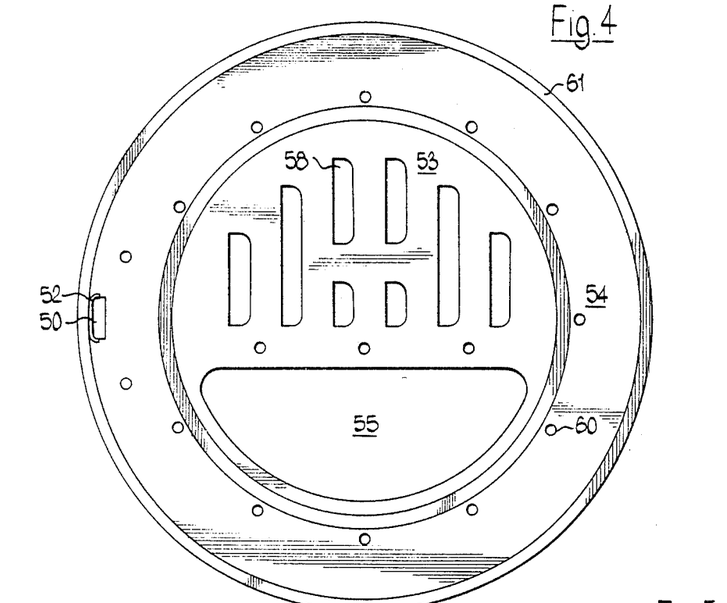
FIG. 4 represents a plan view of the upper side of the lid.
Figure 6:
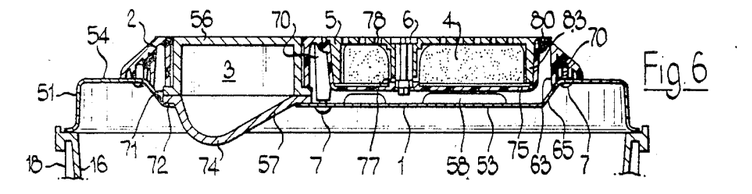
FIG. 6 represents a diametrical sectional view and parallel to the hinge of the upper lid cover mounted on the lid, except the central part of the sectional view which passes through the fixing stud for the filter cartridge.

FIG. 4 represents the upper side of the metal lid 1, a diametrical cross-sectional view appearing in FIG. 5. This diametrical cross-sectional view passes through opening 50 along the essentially vertical outside edge 51 of the lid 1. As shown by FIGS. 4 and 5, this opening 50 is obtained by cutting and lifting a lip 52 which is destined to be engaged in the corresponding opening 14 foreseen in the upper bottom of basin 11 (FIG. 3). On the other hand, the central circular part 53 of lid 1 and which is located in the lower position than the circular ring 54 is provided with the opening 55 in the form of a segment intended for the passage of the shell 3 forming a window with upper and lower superposed surfaces 56 and 57 (FIG. 6). Eight other openings in the form of vents such as 58 are also provided in the remaining segment of the circular central part 53. These vents are destined to allow the passage of the vapours and fumes coming from the vat 16 of the deep fryer towards the upper side of the lid 1 and more particularly the upper lid cover 2 in which is lodged the filter cartridge 4. Any liquid condensing on the upper surface of the lid 1 will be able to flow around the vents 58 in the direction of opening 15 in basin 11. These condensed liquids being able to flow on the lip 59 when the lid is open. The metal lid 1 is still pierced by sixteen holes such as 60 to allow the passage of the fixing screws such as 7 (FIGS. 1, 5 and 6) and which are used in order to make the upper lid cover 2 integral with the lid 1.

As shown on FIG. 5, the outside rim 61 of lid 1 comes to rest on top of the upper horizontal rim of the vat 16 of the deep fryer, immediately inside the vertical edge 62 of the latter. Inside this edge 62, along the vertical wall, one may also foresee a slight groove in the horizontal surface of the rim of the vat 16 on which rests the rim 61 of the lid, in order to ensure a perfect contact on all the periphery of the vat.

In this manner, there is a good thermal contact between the metal lid 1 and the vat 16 which may be in aluminium, by avoiding a space or a joint between the lid and the vat.

This arrangement limits in particular the pressure inside the latter, the noise during the cooking operation is relatively low and a film of condensed liquid can also cooperate to the closure between the lid and the vat while avoiding a closure system with a more hermetic latching. The lower surface of the lid 1 is coated with Teflon (trademark) to withstand the oil and grease fumes.

Figure 2:
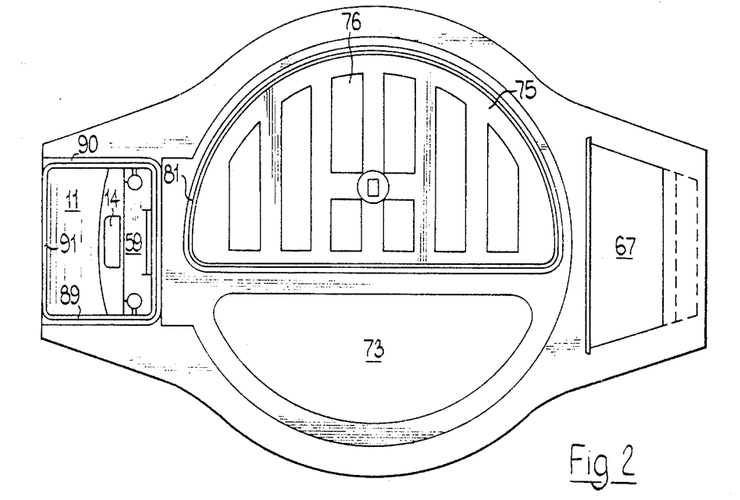
FIG. 2 represents a plan view of the upper part of the upper lid cover.

The upper plastic lid cover 2 is shown in plan views in FIGS. 2 (upper side) and 3 (lower side) and in sectional views in FIGS. 5 and 6. It is lodged on the upper part of lid 1, principally by the circular edge 63 which, as indicated in FIG. 3, extends around the whole circular periphery of lid 1 exept for the passage 64 enabling to reach opening 15 giving access to basin 11. This circular edge 63 is relatively narrow and it is arranged (FIGS. 5 and 6) on the inclined annular part 65 of the lid 1 effecting the junction between the upper crown 54 and the central part 53. The outside rim 66 (FIG. 3) is parallel to the rim 63 for that part around the circular lid 1 but it comes away from the center of the lid to form on the one hand the basin 11, on top of the hinge using the pivot 10, and on the other hand, the handle 67 of the lid. As shown in FIG. 5, this is a re-entrant cavity so as to preserve a flat surface on the upper part of the deep fryer. Parts in the forms of circular arcs 68 and 69 (FIG. 3), diametrically opposed to the lower edge of the upper lid cover 2 come to rest along the nearly vertical wall 51 of the cover and which effects the junction between the upper circular crown 54 and the outside rim 61 resting on the vat 16 of the deep fryer.

Before assembling lid 1 and the upper lid cover 2, the window will be placed between these two elements as indicated in FIGS. 1 and 6. This latter represents the window 3 in a vertical cross-section in a plane parallel to the hinge passing through the center of the lid. The window 3 is made out of Grilamid (trademark) TR55 which is a new polyamide 12 of aliphatic, cyclo-aliphatic and aromatic base presenting itself in the form of granules for moulding operations. Among the properties which make it appropriate for the aim here pursued, there is evidently its transparency, its resistance to water, oil or grease vapours and to the relatively high temperatures which are met in a deep fryer. For what concerns the latter, the Vicat flow temperature of this polyamide 12 is 157° centigrade and its transition temperature 160° centigrade. As already stressed, the window 3 is constituted by a shell presenting in particular an upper surface 56 (FIG. 6) at the upper level of the deep fryer and a lower surface 57 standing generally below the lid 1. The shell may be obtained by moulding of two half-shells, the upper shell being provided with the continuous rim 71 and the lower shell 57 with the rim 72 matching the same contour having the shape of a segment corresponding to opening 55 in lid 1 (FIG. 4) and to opening 73 (FIGS. 2 and 3) in the upper lid cover 2. The two half-shells are then assembled into one by ultrasonic welding of the edges 71 and 72. As shown by FIG. 6, while the upper part 56 of the upper half-shell is flat, the lower side of the lower shell is inclined and its major part is constituted by an inclined plane descending from the right side of the segment and located at the level of the lid 1. This facilitates in particular visibility through the two surfaces 56 and 57 towards the inside and the center of the deep fryer which will normally be used as it is presented, particularly in FIGS. 2, 5 and 9, with the window in front, the hinge on the left and the basket handle on the right, the odour filter being thus at the back.

The transparency of such a window is not only ensured by the choice of a polyamide 12 conserving its transparency at high temperatures and resisting to the vapours present inside a deep fryer, but also by the use of the principle of double windows with the air contained inside the shell 3 insulated from the air and the gases outside the shell. Despite the use of a shell to obtain the two spaced and superposed transparent surfaces 56 and 57, the temperature of the upper side 56 is only of the order of 40° centigrade while that of the lower side 57 which is curved at its lower side 74 to climb back towards the circular arc-shaped part of the segment bounded by the opening 55 of the lid 1 is of the order of 140° centigrade. This climbback is clearly more abrupt than the slope of the plane surface 57 which consequently occupies the major part of the effective surface of the window, this ensuring a good visibility into the inside of the deep fryer.

When the food is initially plunged into the deep fryer, the lid being able to be closed as explained previously, the internal side of the window 57 shall be initially covered with vapour but this will progessively disappear in such a way that cooking can be watched through the window whose lower side 57 remains substantially at the temperature of the lid 1 which may be of the order of 140° centigrade.

While the thin circular rim 63 ensures a good closure of the upper lid cover 2, on the lid 1 in the neighborhood of the slanted crown 65, a thicker edge 74 (FIG. 2) having a segment shape enables the upper lid cover 2 to squeeze the window 3 on the lid 1 by pressure on the welded edges 71 and 72 of the two half-shells constituting the window. By this construction, one thus assures fluid-tightness around the window.

The upper lid cover 2 is also provided with the recess 75 in the shape of a segment complementary to that occupied by the window, this recess thus resting above the corresponding segment 53 of the metal lid 1. As is seen in FIGS. 2 and 3, the bottom of this recess 75 which is designed to house the filter cartridge 4 (FIGS. 5 and 6) is cut away in eight parts such as 76, these substantially rectangular openings corresponding to the vents 58 (FIG. 4) foreseen in the lid 1. In this way, these vents come next to the openings of the grid constituting the bottom of the recess 75. In the middle of the four central vents such as 76, is located a small rectangular recess enabling the passage of a stud 6 (FIG. 1) of the type able to latch by a quarter turn and serving to fix the perforated cover 5 above the recess 75 when the filter cartridge 4, which is also provided with the hole 77 (FIG. 6), has been put into place. Perforations 78 (FIGS. 5 and 6) in the upper part of the cover 5 are circular and equally distributed around its upper surface. As indicated in FIG. 3 representing the lower face of the upper lid cover 2, recess 75 with a grid bottom receiving the filter cartridge is reinforced by ribs such as 78 designed to rest on the lid 1 and which extend circularly around the rectangular opening receiving the lower end of the fixing stud 6 and from there around the four central openings of the grid, this facilitating fixing of the filter cover 5. The three housings 70 receiving the fixing screws 7 and which are located between the opening 73 of the upper lid cover (FIG. 3) and the grid recess 75 on which rests the filter cartridge 4 are united by ribs such as 79 to the rim 74 around the recess 73 for the window so as to ensure a contour matching that of the window 3 on all its height. As indicated by FIGS. 5 and 6, the periphery of the cover 5 is provided with an edge 80 directed towards the bottom and which engages into a corresponding groove 81 (FIG. 2) made around the housing foreseen for the filter cartridge 4, this also ensuring fluid-tightness for the filter in conjunction with the rim 82 (FIG. 1) foreseen around the base of the cartridge 4 and which is pushed on the periphery of the grid by the lower edge 83 of the closing cover 5 for the filter (FIGS. 5 and 6).

It is essentially upon opening the lid 1 that condensation of vapours will be produced following cooling of the lower part of the lid. As this can be opened at more than 90° with respect to the horizontal position shown in FIG. 5, condensed liquids will be able to flow along the lower face of the lid 1 to reach opening 50 (FIG. 4), giving way to the less deep part 13 of the basin 11, and from there run into the deepest part 12, the basin being of course still closed by its lid 9 which is in plastic material like the upper lid cover 2. Two opposite latching tongues 84 and 85, directed downwardly and respectively positioned in the middle of the long sides of the rectangular lid 9 enable to put it into place by simple pressure and to unlatch it easily by raising the lower end of the tongue 85, while ensuring adequate fluid-tightness. Indeed, while tongue 85 extends the external edge of the lid 9 and engages itself into a recess 86 (FIGS. 3 and 5) made in the outside vertical wall of the basin 11, by means of the catching hook 87, on the other side, the latching tongue 84 which is caught on the upper edge of opening 15 constitutes an extension of the internal rectangular lower edge 88. In this way, a rectangular groove is created on the lower contour of the lid and it will come to squeeze the rectangular edge 89 (FIG. 2) which ends the upper part of basin 11, groove 90 being provided on three of its sides, i.e. with the exception of edge 91. Upon opening of the lid, the condensed liquids which are located on the upper part of lid 1 and caught in the substantially circular runway between the edge 63 of the upper lid cover 2 (FIGS. 3 and 5) on the one hand, and the edge 74 surrounding the window and the recess 75 where the filter is lodged on the other. Upon opening of the lid 1, these condensed liquids will be able to run down along the upper part of the surface of this lid and by means of the inclined lip 59 of the upper lid cover 2, reach also basin 11.

As already described, this basin may then be emptied by raising its lid 9 or alternatively, the assembly formed by the lid 1 and the upper lid cover 2 can be unlatched by dislodging the pivot 10 from the hinge as already explained.

FIGS. 7 to 11 relate to the handle 29 for the basket 28, the latter being constituted as shown, by an elongated handle which may pass from a horizontal position as that of FIGS. 9 and 11 to a rest vertical position indicated by interrupted lines in FIG. 9. The two half-shells 30 and 30' (FIG. 7) constituting the handle 29 are substantially identical and the female half-handle 30 is shown in detail in FIG. 8. Besides the housings 92 and 92' (FIG. 8) provided for the screws 31 and 31', as well as the hole 93 enabling the passage of the threaded pivot 34 fixed by nut 35, for assembling the two half-handles by surrounding the latching member 32 and the U-shaped link member 33, each half-shell such as 30 for the female half-handle (FIG. 8) comprises a rim 94 going around the handle with the exception of an interruption at the level of the nose 46. Naturally, the edges of the male and female half-handles are complementary in order to be interlocked. Additionally, the two half-handles are provided with a recess such as 95 and immediately below the latter, a generally rectangular elongated extension 96 whose two arms parallel to the handle are narrower in 97 and 98 so as to be able to house the central part 99 of the latching knob 32 (FIGS. 7 and 9). As shown, this latching knob 32 possesses an upper part 100 with stripes able to be operated by the thumb of the hand holding the handle 29 and a longer lower part 101. The two half-handles such as 30 can thus be assembled one with the other by housing in particular the latching means 32 between the two half-shells in such a manner that the horizontal part 100 can slide in the upper housings 95 of the two half-handles and put one beside one another, while the lower horizontal part 101 slides below the extensions such as 96, the central element 99 being able to be displaced in the cavity formed by the horizontal grooves such as 97 and 98.

The assembly of the two half-handles such as 30 shall also be made by mounting the U-shaped link element 33 on the pivot 34 in such a manner that the ends of the two hook-shaped branches 43 and 43' of the U can pass through the base of the nose 46, the edge 94 being opened at this location as previously indicated. As is particularly shown in FIGS. 9 and 10, these two hooked ends also go through, in 36 and 36' (FIG. 7), the bracket in plastic material 37 whose metal bracket 38 designed to operate the connecting-rods 44 and 44' of the basket 28 is integral therewith.

For the horizontal position of the handle 29 shown in full lines in FIG. 9, basket 28 is in the upper position when the bracket in plastic material 37 has been inserted in the slot 45 (FIG. 11) cut away in the upper rim of the deep fryer. For this horizontal position of handle 29, the latching knob 32 can be displaced in the direction of the deep fryer to occupy the position shown in full lines in FIG. 9 and for which the lefthand end of the upper part 101 of this latching knob 32 rests above the central part of the U-shaped link member 33 which prevents any pivoting of the handle with respect to this element and with respect to the bracket 37 in plastic material. Latching is ensured by an upper knob 113 (FIG. 7) on the righthand end of part 101 and which comes to lock itself in the notch 114 (FIG. 8) provided below the extension 96, a sufficient amount of play enabling unhooking when the knob 32 is withdrawn towards the rear. In this way, the latching position corresponds to a handle firmly fixed to the basket which can thus be handled without difficulties outside the deep fryer.

FIG. 11 indicates that the slot 47 in the upper rim of the vat 16 is arranged in the form of a maze in order to ensure fluid-tightness as well as an adequate mechanical position of the basket and of its handle on the deep fryer, this last point being particularly desirable by taking into account the possibility to shake the basket when the lid is closed. The pillar in plastic material 37 comprises two parallel grooves 102 and 103 which extends along the periphery of the element except its upper surface. These parallel grooves 102 and 103 are designed to surround the corresponding ribs 104 and 105 and arranged in the slot 47. While the outer rib 105 is also U-shaped, it is located along the extension of the upper surface of the upper rim 24 of the vat 16 and while it does not reach the upper horizontal surface 62 of this rim, the lower rim 104 rises up to the upper surface of the vat inside the edge 62. The result is that the groove 103 is interrupted before reaching the upper surface 106 of the bracket 37 in plastic material while on the other hand, the inside groove 102 is prolonged until this surface, which ensures the continuity with the upper rim of the vat 16. It results therefrom that the bracket 37 in plastic material which is also fixed in the rim 107 of the aluminium vat 16 and surrounding the slot 47 is firmly held on the vat despite the relatively small height of the bracket 37 and which offers the advantage not to diminish the effective height of the deep fryer, the oil being in any event unable to go beyond a certain height. On the other hand, this maze joint also ensures a good fluid-tightness for the fumes and it is not essential that the rib 104 should be extended along a U-shaped path as the rib 105, two vertical ribs being adequate.

When basket 28, integral with handle 29, is thus put into place (FIG. 9), by withdrawing the latching knob 32 towards the rear, the weight of the basket 28 to which are tied the connecting-rods 44 and 44' whose curved hook-shaped ends such as 108 and 108' for the upper connecting-rod 44 are inserted by resilient action in corresponding holes provided in the pillars such as 109 integral with basket 28, will entail the falling back of handle 29 in the vertical position shown in interrupted lines in FIG. 9. Indeed, the weight of basket 28 will cause the upper connecting-rod 44 to pivot around the slots 110 and 110' (FIG. 10) obtained by folding of the metallic bracket 38. The bow-shaped part 45 of this hook will pivot in the direction of the center of the deep fryer and carry away the link element 33 by its hooks 43 and 43' which will enable handle 29 to assume the vertical position shown in interrupted lines in FIG. 9, the conformation of nose 49 enabling it to pivot by 90° and to draw closer to the outside surface of the deep fryer. Indeed, the rotation axis corresponding to hole 93 is offset with respect to the curvature center of the nose and as shown for the vertical position of handle 29, it is going to be displaced towards the deep fryer. The lower connecting-rod 44' can pivot in a rim 111 of the metal bracket 38 and enables the basket 28 to preserve a substantially horizontal position during these vertical movements.

The vertical pillars in plastic material 17 on the side of the hinge (FIG. 5) and 17' (FIG. 9) on the side of the handle 29 are each fixed by two screws (not shown) in the recess such as 48' for the pillar 17' in which is housed handle 29 when in the vertical position. The internal parts of these pillars conform to the cylindrical surface of the thin sheet metal housing 18 constituting the outside of the deep fryer around the vat 16 and these vertical pillars are provided at their lower parts, at the level of the plastic bottom 112 of the deep fryer (FIG. 9) of a horizontal extension (not shown) towards the inside of the deep fryer, followed by a vertical edge having a circular arc shape and directed towards the bottom so that it may be hooked on the inside of the circular edge of the plastic bottom 112, the latter bearing on a circular rim directed towards the upper part of the deep fryer (not shown), interrupted along circular arcs corresponding to the vertical pillar such as 17', and being housed on the inside of the thin sheet metal cylindrical housing 18. Finally, a nut (not shown) on the lower side of the plastic bottom 112 and at the center thereof ensures fixing of this bottom part and in this way completes that of the pillars 17 and 17' in making this bottom part 112 integral with the vat 16.

Various modifications and variants of the invention are of course possible. For example the filter must not necessarily use a cartridge containing solely activated carbon and metallic filters or elimination by catalytic oxidation can also be envisaged. If the movement of the handle of the basket around a transverse axis passing through one end enables a natural grip as well as a relatively simple construction, rotation of such a handle around its longitudinal axis could also be suitable by using a hooking nose for the basket having an appropriate shape. The element tranversing the bracket shown in the slot provided in the upper rim of the deep fryer would this time be cylindrical and would rotate around its axis in a corresponding recess, instead of sliding back and forth. It would thus communicate to the hooking nose the rotation of the handle around its axis in order to raise and lower the bow-shaped part of the upper connecting-rod connected to the basket.

Therefore, while the principles of the invention have been described above in connection with specific apparatus, it is to be clearly understood that this description is made only by way of example and not as a limitation on the scope of the invention.

We claim:

1. A cooking appliance including: a vat for containing food during cooking, and lid means for engaging said vat, said lid means having a transparent portion forming a double window consisting exclusively of an upper window and a lower window congruently placed on top of each other and an air space sealed there-between, such that said lower window is exposed to cooking vapors emanating from said vat and said upper window is exposed to the outside atmosphere whereby improved visibility through said windows is obtained during cooking, and wherein said upper and lower windows comprise a single unitary closed shell surrounding said air space; an upper lid cover mounted on said lid means, said upper lid cover and said lid means having openings with edge sections, and wherein said upper and said lower windows are provided with external rims at the outer peripheries, said rims being mounted between said edge sections of said openings in said upper lid cover and said lid means such that windows are incorporated in said lid.

2. A cooking appliance as claimed in claim 1, wherein said lid means is comprised of metal to provide good thermal contact between said vat and said lower window.

3. A cooking appliance as claimed in claim 1 wherein said windows are comprised of a polyamide 12 material with aliphatic, cyclo-aliphatic and aromatic base, said windows being transparent and resistant to heat, oil and grease vapors.

4. Cooking appliance as claimed in claim 1, wherein said lower window includes a plane inclined downwardly in the direction of the wall of the appliance vat.

5. A cooking appliance as claimed in claim 6 wherein said lid means is circular in shape and said windows are included within a segment of said lid and further including a complementary segment having therein an odor filter.

6. A cooking appliance as claimed in claim 5, wherein said lower window includes a curved part climbing towards the edge of the said vat.

7. A cooking appliance as claimed in claim 1 wherein said upper window is shaped to include a horizontal surface and a substantially vertical wall disposed between said horizontal surface and said rims and wherein said opening in said upper lid cover surrounds said vertical wall.

8. A cooking appliance as claimed in claim 1, wherein said upper and lower windows are molded from two half-shells each being terminated by a rim and wherein said rims are joined by ultrasonic welding such that said rim is squeezed between said lid and said upper lid cover.

* * * * *